United States Patent

[11] 3,621,931

| [72] | Inventor | Rowland D. Hunt<br>Paulsgrove, Portsmouth, England |
|---|---|---|
| [21] | Appl. No. | 810,200 |
| [22] | Filed | Mar. 25, 1969 |
| [45] | Patented | Nov. 23, 1971 |
| [73] | Assignee | Vosper Limited |
| [32] | Priority | Mar. 26, 1968 |
| [33] | | Great Britain |
| [31] | | 14,570/68 |

[54] GAS-CUSHION VEHICLES
6 Claims, 2 Drawing Figs.

[52] U.S. Cl. ................................... 180/117, 180/127
[51] Int. Cl. ....................................... B60v 1/00
[50] Field of Search ............................ 180/118, 127, 128, 120, 117

[56] References Cited
UNITED STATES PATENTS

| 3,313,366 | 4/1967 | Dionisio et al. | 180/120 |
| 3,318,404 | 5/1967 | Hopkins et al. | 180/128 X |
| 3,321,039 | 5/1967 | Watts | 180/127 |
| 3,397,753 | 8/1968 | Hunt et al. | 180/127 |
| 3,409,103 | 11/1968 | Tripp | 180/127 |
| 3,483,939 | 12/1969 | Maddock et al. | 180/127 |

*Primary Examiner*—A. Harry Levy
*Attorney*—Norris & Bateman

ABSTRACT: A skirt shift system for a gas-cushion vehicle having a flexible segmented skirt in which movement of the skirt relative to the hull is influenced by the provision of pivotable links secured to the hull and to the inner corners of the segments, and power operated means are connected to the links.

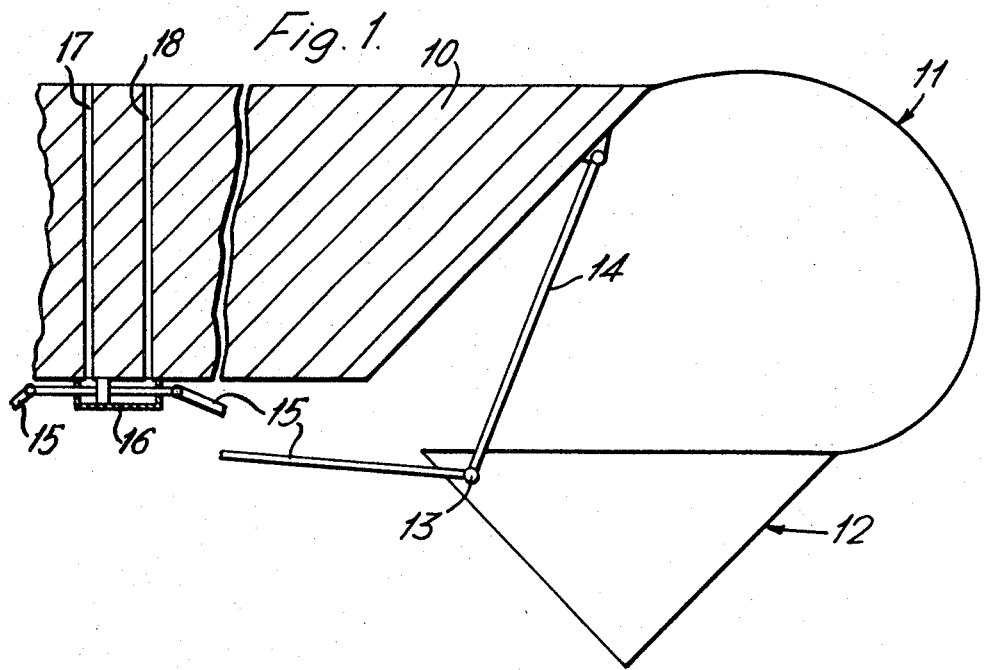
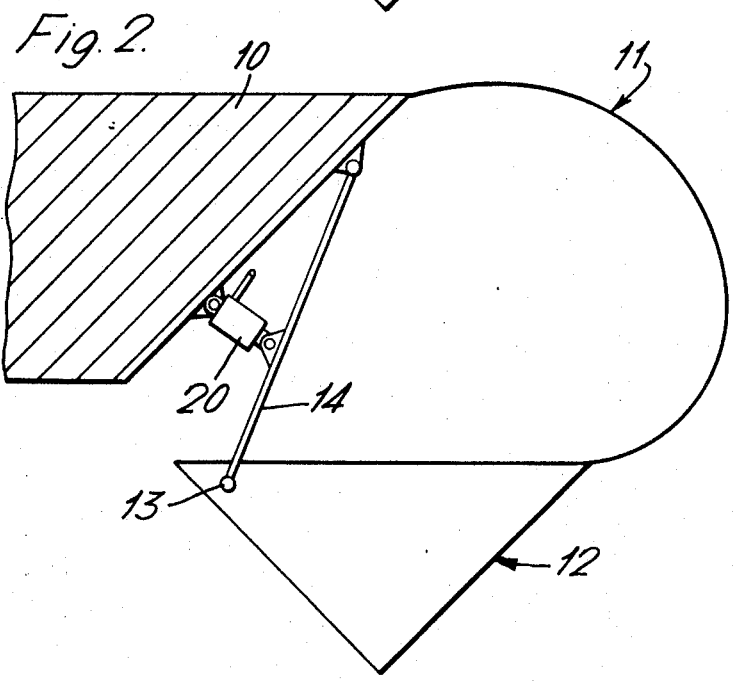
INVENTOR
ROWLAND D. HUNT
BY Norris & Bateman

GAS-CUSHION VEHICLES

BACKGROUND OF THE INVENTION

The invention relates to gas-cushion vehicles of the type provided with flexible skirts, and more particularly to a skirt shift system for enabling the center of pressure of the gas cushion to be displaced to adjust the trim of the vehicle.

SUMMARY OF THE INVENTION

The object of the invention is to provide an improved skirt shift system which is less susceptible to damage by sand and water.

According to the invention, a skirt shift system for a gas-cushion vehicle comprises a plurality of members each mounted at one end on the hull for swinging movement relative thereto and connected at the other end to the skirt.

DESCRIPTION OF THE INVENTION

The invention will now be described, by way of example only, with reference to the accompanying drawings of which:

FIG. 1 is a diagrammatic transverse section through part of a gas-cushion vehicle;

FIG. 2 is a similar view of an alternative arrangement.

Referring now to FIG. 1 of the drawings, a gas-cushion vehicle has a hull 10 carrying a full skirt 11 including a segmented lower portion 12. Along each side of the hull 10, the segments are divided into groups of, say, ten which are interconnected at their inner corners by a rod 13. Each rod has pivotally connected to it the lower ends of two or more links 14 the upper ends of which are pivotally connected to the hull 10. Each rod also has pivotally connected to it, adjacent the points of connection thereto of the links 14, the outer ends of further links 15, equal in number to the links 14, which are connected at their inner ends to an operating jack 16 that is oppositely actuated as by fluid entering through conduits 17 or 18. A plurality of operating jacks, as well as of segment groups, are provided along the length of the vehicle. Each jack is connected both to a rod 13 on the portside of the vehicle and to a similar rod on the starboard side thereof, and the arrangement is such that when a port group of segments is moved laterally inwards the starboard group connected to the same operating jack moves laterally outwards and vice versa so as to move the Center of Pressure laterally of the vehicle.

The lower portion 12 of the skirt 11 at the front and rear of the hull 10 is also divided into groups of segments controlled by links 14, rods 13, and further links 15 connected at their inner ends to operating jacks in the same manner as at the sides, to enable the Center of Pressure of the vehicle to be moved longitudinally.

The pivoted links 14 stabilize the inner corners of the skirt segments and maintain the attitude of the lower portion of the skirt to the water as the skirt is moved relative to the hull.

Movement of the skirt is controlled by an aircraft-type column (not shown) pivotally mounted at its lower end about an axis disposed transversely of the vehicle, and provided at its upper end with a substantially semicircular member movable about its axis which is disposed longitudinally of the vehicle. The direction and amount of displacement of the substantially semicircular member about its axis determines the direction and amount of displacement of those parts of the skirt disposed along each side of the hull by the operating jacks connected to said parts. The direction and amount of displacement of the control column from a vertical position determine the direction and amount of displacement of those parts of the skirt disposed at the front and rear of the hull by the operating jacks connected to said parts. The use of such a control column thus enables the direction of the vehicle to be readily sensed and corrected by lateral and/or longitudinal movement of the Center of Pressure within the cushion area. Movement of the Center of Pressure may also be used in conjunction with rudder control when effecting changes in the direction of travel of the vehicle.

In a modification, the links 14 are pivotally connected to the links 15 near the outer ends of the latter, or alternatively the links 15 are pivotally connected to the links 14 near the lower ends of the latter.

In another modification, the links 14 and/or the links 15 are replaced by flexible cables or chains.

In a further modification, the inner corners of the skirt segments at the front of the vehicle are connected to an inwardly extending fabric beam, that is to say to a laterally continuous length of skirt material, and a similar beam is provided at the rear of the vehicle. A fabric beam has the advantages of greater flexibility in both the transverse and vertical directions whilst maintaining the skirt substantially parallel to the periphery of the hull. The inner edge of each fabric beam is connected by means of cables to one end of a single operating jack.

In an alternative arrangement, see FIG. 2, the pivoted links 14 are rigid and each pair of further links 15 is replaced by a pair of pivotally mounted operating jacks 20, the jacks of each pair being operatively interconnected to that when the front or port group of segments under the control of one of said jacks is moved inwardly the rear or starboard group of segments under the control of the other of said jacks is moved outwardly and vice versa.

The rows of pivoted links 14 has the advantage that the further links 15 or the operating jacks 20, as the case may be, can be disconnected and parts of the skirt swung outwardly on the pivoted links 14 to enable the skirt to be inspected.

What I claim is:

1. A gas-cushion water vehicle comprising a hull, a flexible skirt bounding at least in part a cushion space beneath said hull and comprising at each side of the hull a loop portion and a plurality of segments depending from said loop portion, a plurality of depending fixed length tie members at each side of the hull each connected at one end to said hull for swinging movement relative thereto, means operatively connecting the other ends of each of said tie members to at least one of said segments at that side of the segment that in innermost with respect to said hull, power operated means, means operatively connecting said power operated means to said tie members, said power operated means and connecting means effecting opposite swinging movement of said tie members at opposite sides of the hull for shifting the center of pressure within the cushion space laterally of said hull while maintaining the attitude of the lower portion of said skirt relative to the water.

2. A gas-cushion vehicle according to claim 1, further characterized in that each member is pin jointed to the hull.

3. A gas-cushion vehicle according to claim 1, said power operated means comprising actuator means, and a pair of elements contained within the cushion space, one of said elements being operatively connected to tie members at one side of the hull and the other of said elements being operatively connected to tie members at the other side of said hull.

4. A gas-cushion vehicle according to claim 3, further characterized in that each element is a rigid link.

5. A gas-cushion vehicle according to claim 3, further characterized in that the members and the elements are connected to the skirt at substantially the same points.

6. A gas-cushion vehicle according to claim 1, further characterized in that the power operated means comprise a plurality of actuators each contained within said loop portion of the skirt and connected to one of the tie members.

* * * * *